United States Patent
Swoboda et al.

(10) Patent No.: US 7,590,894 B2
(45) Date of Patent: Sep. 15, 2009

(54) METHOD OF TRANSLATING SYSTEM EVENTS INTO SIGNALS FOR ACTIVITY MONITORING

(75) Inventors: Gary L. Swoboda, Sugar Land, TX (US); Oliver P. Sohm, Toronto (CA); Manisha Agarwala, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 526 days.

(21) Appl. No.: 11/383,466

(22) Filed: May 15, 2006

(65) Prior Publication Data
US 2006/0259833 A1    Nov. 16, 2006

Related U.S. Application Data

(60) Provisional application No. 60/681,427, filed on May 16, 2005, provisional application No. 60/681,551, filed on May 16, 2005.

(51) Int. Cl.
*G06F 11/00*    (2006.01)

(52) U.S. Cl. .................................. 714/45; 717/128
(58) Field of Classification Search ............... None
See application file for complete search history.

(56) References Cited

U.S. PATENT DOCUMENTS

| 6,684,348 | B1 * | 1/2004 | Edwards et al. | 714/45 |
|---|---|---|---|---|
| 7,058,928 | B2 * | 6/2006 | Wygodny et al. | 717/128 |
| 7,069,544 | B1 * | 6/2006 | Thekkath | 717/128 |
| 7,100,152 | B1 * | 8/2006 | Birum et al. | 717/131 |
| 7,200,588 | B1 * | 4/2007 | Srivastava et al. | 707/3 |
| 7,334,114 | B2 * | 2/2008 | Sohm et al. | 712/227 |
| 2004/0103399 | A1 * | 5/2004 | Agarwala et al. | 717/128 |
| 2004/0158776 | A1 * | 8/2004 | McCullough et al. | 714/45 |

* cited by examiner

*Primary Examiner*—Gabriel L Chu
(74) *Attorney, Agent, or Firm*—Robert D. Marshall, Jr.; Wade J. Brady, III; Frederick J. Telecky, Jr.

(57) ABSTRACT

Disclosed herein is a system and method for receiving encoded events from a system that is being debugged or profiled. The encoded events are input to a decoder in order to decode the encoded events, wherein the decoder is configured to selectively adjust the bandwidth of decoded events. The decoded events are input to a monitoring system in order to enable a user to debug and profile the system.

14 Claims, 3 Drawing Sheets

3-BIT ENCODED EVENTS

| | 0/1 |
|---|---|
| 0 | 0/1 |
| 1 | 0/1 |
| 2 | 0/1 |

DECODING EVENTS →

| 2 | 1 | 0 | |
|---|---|---|---|
| 0 | 0 | 0 | → EVENT 0 |
| 0 | 0 | 1 | → EVENT 1 |
| 0 | 1 | 0 | → EVENT 2 |
| 0 | 1 | 1 | → EVENT 3 |
| 1 | 0 | 0 | → EVENT 4 |
| 1 | 0 | 1 | → EVENT 5 |
| 1 | 1 | 0 | → EVENT 6 |
| 1 | 1 | 1 | → EVENT 7 |

3-BIT ENCODED EVENTS

| 0 | 0/1 |
|---|---|
| 1 | 0/1 |
| 2 | 0/1 |

DECODING EVENTS →

| 2 |
|---|
| 0/1 | → EVENT QUALIFIER

| 1 | 0 | |
|---|---|---|
| 0 | 0 | → EVENT 0 |
| 0 | 1 | → EVENT 1 |
| 1 | 0 | → EVENT 2 |
| 1 | 1 | → EVENT 3 |

METHOD OF TRANSLATING SYSTEM EVENTS INTO SIGNALS FOR ACTIVITY MONITORING

CROSS-REFERENCE TO RELATED APPLICATIONS

This application claims the benefit of U.S. Provisional Application Ser. No. 60/681,551 filed May 16, 2005, titled "Emulation Debugging With Real-Time System Control," and U.S. Provisional Application Ser. No. 60/681,427 filed May 16, 2005, titled "Debugging Software-Controlled Cache Coherence," both of which are incorporated by reference herein as if reproduced in full below.

This application also may contain subject matter that may relate to the following commonly assigned co-pending applications incorporated herein by reference: "Real-Time Monitoring, Alignment, and Translation of CPU Stalls or Events," Ser. No. 11/383,361, filed May 15, 2006, "Event and Stall Selection," Ser. No. 11/383,442 filed May 15, 2006, "Watermark Counter With Reload Register," Ser. No. 11/383,464 filed May 15, 2006, "Real-Time Prioritization of Stall or Event Information," Ser. No. 11/383,465, filed May 15, 2006, "System and Methods For Stall Monitoring," Ser. No. 11/383,472, filed May 15, 2006, "Monitoring of Memory and External Events," Serial No. 11/383,473, filed May 15, 2006, "Event-Generating Instructions," Ser. No. 11/383,433, filed May 15, 2006, and "Selectively Embedding Event-Generating Instructions," Ser. No. 11/383,438, filed May 15, 2006.

BACKGROUND

Integrated circuits are ubiquitous in society and can be found in a wide array of electronic products. Regardless of the type of electronic product, most consumers have come to expect greater functionality when each successive generation of electronic products are made available because successive generations of integrated circuits offer greater functionality such as faster memory or microprocessor speed. Moreover, successive generations of integrated circuits that are capable of offering greater functionality are often available relatively quickly. For example, Moore's law, which is based on empirical observations, predicts that the speed of these integrated circuits doubles every eighteen months. As a result, integrated circuits with faster microprocessors and memory are often available for use in the latest electronic products every eighteen months.

Although successive generations of integrated circuits with greater functionality and features may be available every eighteen months, this does not mean that they can then be quickly incorporated into the latest electronic products. In fact, one major hurdle in bringing electronic products to market is ensuring that the integrated circuits, with their increased features and functionality, perform as desired. Generally speaking, ensuring that the integrated circuits will perform their intended functions when incorporated into an electronic product is called "debugging" the electronic product. Also, determining the performance, resource utilization, and execution of the integrated circuit is often referred to as "profiling". Profiling is used to modify code execution on the integrated circuit so as to change the behavior of the integrated circuit as desired. The amount of time that debugging and profiling takes varies based on the complexity of the electronic product. One risk associated with the process of debugging and profiling is that it delays the product from being introduced into the market.

To prevent delaying the electronic product because of delay from debugging and profiling the integrated circuits, software based simulators that model the behavior of the integrated circuit are often developed so that debugging and profiling can begin before the integrated circuit is actually available. While these simulators may have been adequate in debugging and profiling previous generations of integrated circuits, such simulators are increasingly unable to accurately model the intricacies of newer generations of integrated circuits. Further, attempting to develop a more complex simulator that copes with the intricacies of integrated circuits with cache memory takes time and is usually not an option because of the preferred short time-to-market of electronic products. Unfortunately, a simulator's inability to effectively model integrated circuits results in the integrated circuits being employed in the electronic products without being debugged and profiled fully to make the integrated circuit behave as desired.

SUMMARY

Disclosed herein is a system and method for receiving encoded events from a system that is being debugged or profiled. The encoded events are input to a decoder in order to decode the encoded events, wherein the decoder is configured to selectively adjust the bandwidth of decoded events. The decoded events are input to a monitoring system in order to enable a user to debug and profile the system.

The decoder may be embodied as software on the monitoring system for decoding the encoded events in post-processing. Alternatively, the decoder may be embodied as a hardware decoder that decodes all of the encoded events. The decoded events are then input to an event selector for selectively adjusting the bandwidth of decoded events being input to the monitoring system by selecting a subset of the decoded events.

BRIEF DESCRIPTION OF THE DRAWINGS

For a detailed description of exemplary embodiments of the invention, reference will now be made to the accompanying drawings in which.

DETAILED DESCRIPTION

Figure 1:
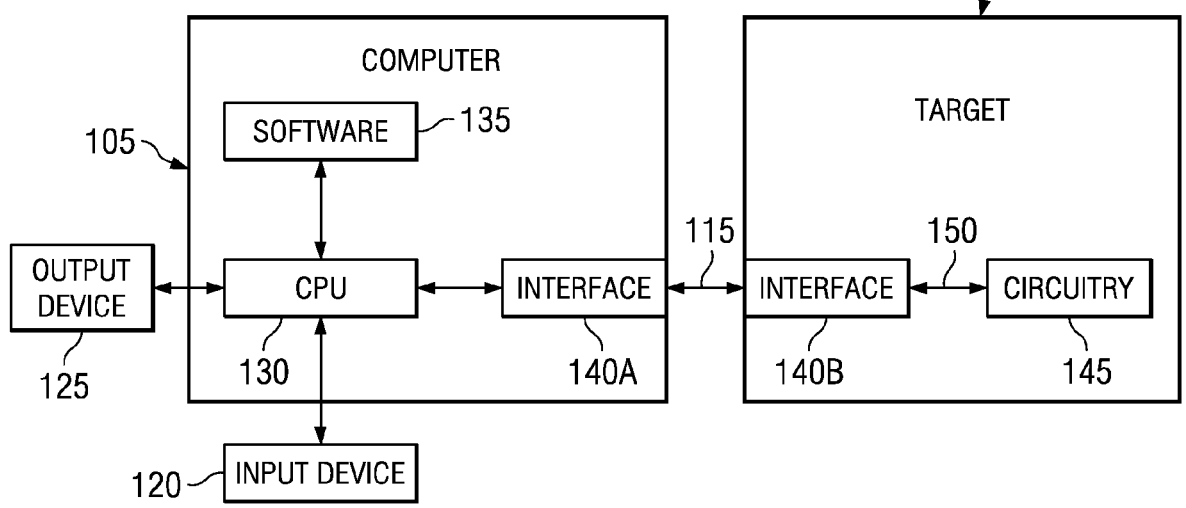
FIG. 1 depicts an exemplary debugging and profiling system in accordance with a preferred embodiment of the invention.

FIG. 1 depicts an exemplary debugging and profiling system 100 including a host computer 105 coupled to a target device 110 through a connection 115. A user may debug and profile the operation of the target device 110 by operating the host computer 105. The target device 110 may be debugged and profiled in order for the operation of the target device 110 to perform as desired (for example, in an optimal manner) with circuitry 145. To this end, the host computer 105 may include an input device 120, such as a keyboard or mouse, as well as an output device 125, such as a monitor or printer. Both the input device 120 and the output device 125 couple to a central processing unit 130 (CPU) that is capable of receiving commands from a user and executing software 135 accordingly. Software 135 interacts with the target 110 and may allow the debugging and profiling of applications that are being executed on the target 110.

Connection 115 couples the host computer 105 and the target device 110 and may be a wireless, hard-wired, or optical connection. Interfaces 140A and 140B may be used to interpret data from or communicate data to connection 115 respectively according to any suitable data communication method. Connection 150 provides outputs from the circuitry 145 to interface 140B. As such, software 135 on host computer 105 communicates instructions to be implemented by circuitry 145 through interfaces 140A and 140B across connection 115. The results of how circuitry 145 implements the instructions is output through connection 150 and communicated back to host computer 105. These results are analyzed on host computer 105 and the instructions are modified so as to debug and profile applications to be executed on target 110 by circuitry 145.

Connection 150 may be a wireless, hard-wired, or optical connection. In the case of a hard-wired connection, connection 150 is preferably implemented in accordance with any suitable protocol such as a Joint Testing Action Group (JTAG) type of connection. Additionally, hard-wired connections may include a real time data exchange (RTDX) type of connection developed by Texas instruments, Inc. Briefly put, RTDX gives system developers continuous real-time visibility into the applications that are being implemented on the circuitry 145 instead of having to force the application to stop, via a breakpoint, in order to see the details of the application implementation. Both the circuitry 145 and the interface 140B may include interfacing circuitry to facilitate the implementation of JTAG, RTDX, or other interfacing standards.

The target 110 preferably includes the circuitry 145 executing code that is actively being debugged and profiled. In some embodiments, the target 110 may be a test fixture that accommodates the circuitry 145 when code being executed by the circuitry 145 is being debugged and profiled. The debugging and profiling may be completed prior to widespread deployment of the circuitry 145. For example, if the circuitry 145 is eventually used in cell phones, then the executable code may be designed using the target 110.

The circuitry 145 may include a single integrated circuit or multiple integrated circuits that will be implemented as part of an electronic device. For example, the circuitry 145 may include multi-chip modules comprising multiple separate integrated circuits that are encapsulated within the same packaging. Regardless of whether the circuitry 145 is implemented as a single-chip or multiple-chip module, the circuitry 145 may eventually be incorporated into an electronic device such as a cellular telephone, a portable gaming console, network routing equipment, etc.

Debugging and profiling the executable firmware code on the target 110 using breakpoints to see the details of the code execution is an intrusive process and affects the operation and performance of the code being executed on circuitry 145. As such, a true understanding of the operation and performance of the code execution on circuitry 145 is not gained through the use of breakpoints.

Figure 2:
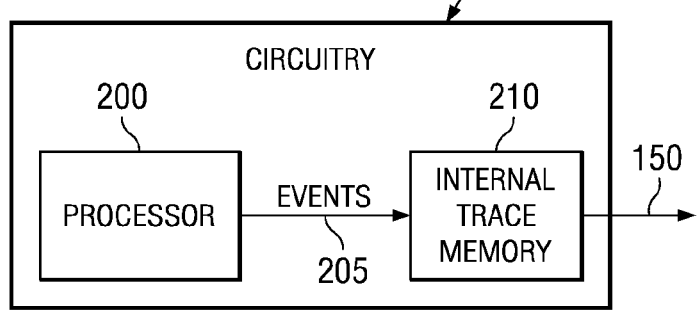
FIG. 2 depicts an embodiment of circuitry where code is being debugged and profiled using a trace.

FIG. 2 depicts an embodiment of circuitry 145 where code is being debugged and profiled using a trace on circuitry 145 to monitor events. Circuitry 145 includes a processor 200 which executes the code. Through the operation of the processor 200 many events 205 may occur that are significant for debugging and profiling the code being executed by the processor 200. The term "events" or "event data" herein is being used broadly to describe any type of stall in which processor 200 is forced to wait before it can complete executing an instruction, such as a CPU stall or cache stall; any type of memory event, such as a read hit or read miss; and any other occurrences which may be useful for debugging and profiling the code being executed on circuitry 145. The internal trace memory 210 records the events 205 as event data and outputs the event data through connection 150 to computer 105. This enables a user of the computer 105 to see how the execution of the code is being implemented on circuitry 145.

As successive generations of processors are developed with faster speeds, the number of events occurring on a processor such as processor 200 similarly increases, however, the bandwidth between computer 105 and circuitry 145 through connection 150 is limited. The amount of event data 205 recorded using a trace may exceed the bandwidth of connection 150. As such, for this solution to be implemented a trace may only be run for a very limited amount of time so as to not fill up internal trace memory 210. This situation is analogous to a sink that drains much less water than the faucet is putting into the sink. In order to prevent the sink from overflowing the faucet may only be turned on for a limited amount of time. This solution of only running the trace for a very short time may not be preferable since it would give a very limited view of the execution of the code on circuitry 145. Alternatively, internal trace memory 210 may be very large so as to accommodate the large amount of event data. This may not be preferable either, since trace memory 210 would then take up a large area on circuitry 145 and consume more power.

Figure 3:
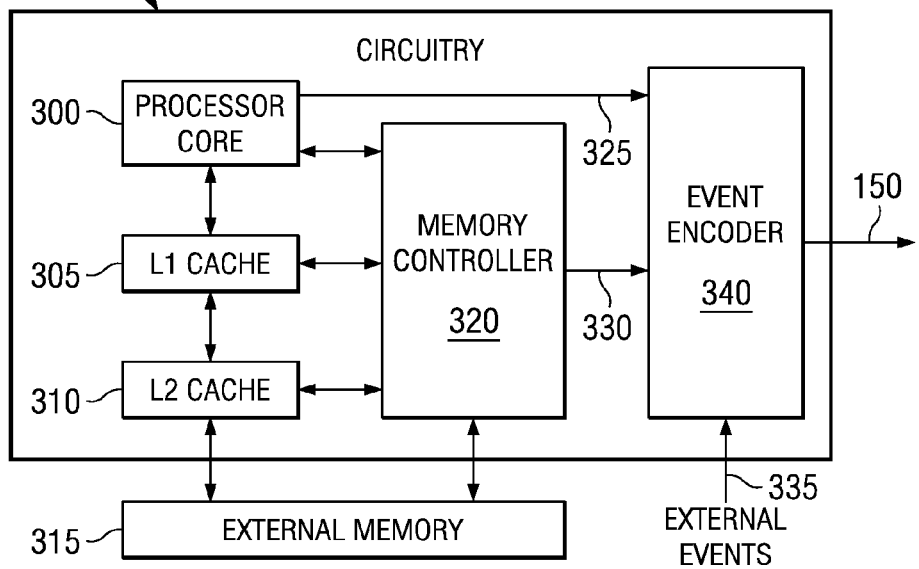
FIG. 3 depicts a preferred embodiment of circuitry where code is being debugged and profiled using a trace.

As such, intelligent ways of reducing the amount of event data without loosing any or much information are desirable. FIG. 3 discloses another embodiment of circuitry 145 where code is being debugged and profiled using a trace on circuitry 145 to monitor events. Circuitry 145 includes a processor core 300 which executes the code. Processor 300 interacts with memory controller 320 in order to input data and instructions from various levels of a memory subsystem and output data manipulated according to the instructions. The memory subsystem may include an L1 cache memory 305, which may be divided into a program portion of L1 cache and a data portion of L1 cache; an L2 cache memory 310, which may be larger and slower than the L1 cache memory; and an external memory 315, which may be a random access memory (RAM), or any other suitable external storage. Through executing the code, stalls may occur in the processor core 300 wherein stall signals indicating that these stalls occurred are output from processor core 300 to event encoder 340 through connection 325. Stalls occur when the processor core 300 is forced to wait before it can complete executing an instruction. Stalls can occur for a wide variety of reasons, for example if the processor core 300 has to wait while a data element is being fetched or if the processor core 300 has to wait while an area in cache is being freed up to write the result of an instruction.

Memory controller 320 outputs memory events 330 to event encoder 340. Memory events can also occur for a wide variety of reasons, for example a read hit on the L1 cache 305 or a read miss on the L1 cache 305. Note that certain memory events 330 may also cause a stall, but not all memory events cause a stall. For example a read miss on the L1 cache 305 will also cause a stall until the data that is needed is forwarded to the L1 cache 305. A read hit is an example of a memory event that would not cause a stall.

External events 335 may also be input to event encoder 340. External events 335 may include interrupt routines executed on processor core 300 for interacting with external devices. Monitoring these external events enables a user of computer 105 for example to determine the real-time deadlines for executing the interrupt routines. Event encoder 340 combines and/or selectively outputs the various event data to computer 105 through connection 150. The encoded event data that is sent to computer 105 is decoded and interpreted in order to enable a user on computer 105 to debug and profile the execution of code on circuitry 145. Related application Attorney Docket Number 1962-31400 "Real-Time Monitoring, Alignment, and Translation of CPU Stalls or Events" by Sohm et al., describes an implementation of event encoder 340. The content of the above referenced application is herein incorporated by reference in its entirety.

Event data may be encoded and exported from event encoder 340 in a plurality of ways. Some ways in which event encoder 340 may export the event data are as a fully binary coded stream of data, a partially binary coded stream of data wherein not all binary combinations are defined, event data may be mapped one-to-one with each event signal corresponding to a unique event, or any combination of the above. In the partially binary coded case, some of the combinations may not be defined if they involve two events that do not occur together. For example, a combination where a victim occurs along with cache hits or a combination with an L1 cache hit along with an L2 cache hit would not occur together.

The events that are output from event encoder 340 are sent to a monitoring system such as computer 105. The data sent to the monitoring system may be in a form which is not easy to interpret by a user. For example, event encoder 340 may output a 4-bit code '0010' corresponding to an L1 cache read miss with dirty line eviction that hits in L2 cache. The 4-bit code may interpreted by bit0corresponding to a read or write operation, bit 1 corresponding to an L1 cache hit or miss, bit2corresponding to an L2 cache hit or miss, and bit 3 corresponding to whether or not there was a victim. While meaning may be derived from this 4-bit code it may not be intuitive to a user what the code is representing. Further, the data sent to the monitoring system may not be in a form suitable for simple monitoring systems that count events. If encoded events are counted directly the context of the events may be lost and meaning may not be derived from the count values. Also, the data sent to the monitoring system may require the connection to the monitoring system and the monitoring system itself to be able to handle a high bandwidth of data to be transferred and interpreted. While event encoder 340 may reduce the amount of event data to be sent to computer 105, all of the events output from event encoder 340 are sent to computer 105 even if a user only is interested in a small number of events that are being output from event encoder 340. While it may be desirable to monitor all of the events output from event encoder 340 simultaneously, a monitoring system may support a lower bandwidth of data than event encoder 340 is outputting. As such it may be preferable to allow a user to adjust the bandwidth to the monitoring system for a given debugging task by selecting a subset of events output from event encoder 340.

Figure 4A:
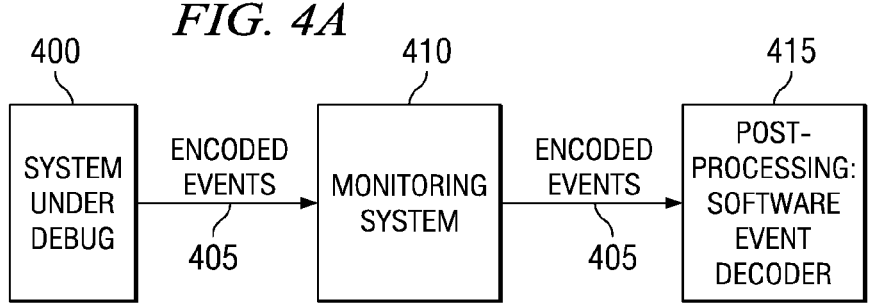
FIG. 4A depicts a decoder embodied as a software decoder executed in post-processing on a monitoring system.
Figure 4B:
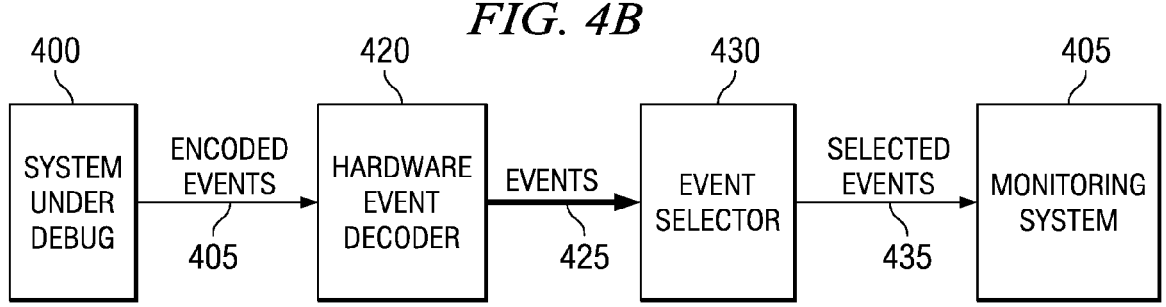
FIG. 4B depicts a decoder embodied as a hardware decoder.

FIGS. 4A and 4B depict two solutions for a monitoring system to handle the encoded events that are output from event encoder 340. FIG. 4A depicts a solution for decoding the encoded events in a post-processing software routine. As shown in FIG. 4A a system that is being debugged 400 outputs encoded events 405. System 400 may be target device 110 shown in FIG. 1 and the encoded events 405 may be the encoded event data output from event encoder 340 in FIG. 3. The encoded events 405 are output to a monitoring system 410 which may be computer 105 of FIG. 1. Monitoring system 410 may then use a post-processing software event decoder, which may be implemented by software 135, to decode events desired by the user of monitoring system 410. With this solution, it may be possible to decode the events and presented them to a user in a manner that is easy to interpret or count the events directly while retaining their context. However, the monitoring system 410 in this solution must be able to handle the bandwidth of all of the encoded events 405 and have sufficient processing power such that the events may be decoded in software in an expedited manner.

FIG. 4B depicts a solution for decoding the encoded events through the use of a hardware event decoder 420 and an event selector 430. As shown in FIG. 4B a system that is being debugged 400 outputs encoded events 405. Hardware event decoder 420 inputs the encoded events 405, decodes the events, and outputs the decoded events 425 to an event selector 430. Note that the amount of data needed to represent the decoded events 425 is greater than the amount of data needed to represent the encoded events 405. A user may use event selector 430 to select a desired subset of the events 425 to be output. The selected events 435 may then be input to the monitoring system 405. As such, the monitoring system in this solution does not have to decode the events and may present them to a user in a manner that is easy to interpret or count the events directly while retaining their context. Further, any bandwidth restrictions on the part of the monitoring system may be handled by varying the number of events selected by event selector 430. Note that if the monitoring system 405 has sufficient bandwidth and processing power all of the events 425 may be selected by event selector 430 to be input to the monitoring system 405.

Figures 5, 6, 7:
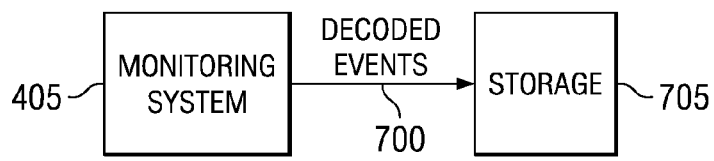
FIG. 5 depicts an example of fully decoding an encoded event.
FIG. 6 depicts an example of partially decoding an event.
FIG. 7 depicts an example of the monitoring system recording decoded events in storage.

The encoded events 405 may be fully or partially decoded by the post-processing software decoder 415 or the hardware decoder 420. FIG. 5 depicts how the encoded events 405 may be fully decoded. If a 3-bit binary encoded event is input to a decoder then eight exclusive values may be derived from those three bits. In particular, each bit may be represented by either a "0" or a "1". Since there are three bits that can be represented by two values then there are $2^3$ or eight possible combinations of 0's and 1's. This is represented by the table showing each of the eight combinations for the three bits, where each combination may represent a unique event. As mentioned above, not all combinations of events may make sense. For example, a combination of two events that do not occur simultaneously may not present useful information to the monitoring system 405. In particular, a combination where a victim occurs along with a cache hit or a combination with an L1 cache hit along with an L2 cache hit would not occur together and as such it may not be useful to decode all of the possible combinations. This may be illustrated in the example shown in FIG. 5 if the $0^{th}$ bit represents read operations with a "0" representing a read miss and a "1" representing a read hit; the $1^{st}$ bit represents write operations with a "0" representing a write miss and a "1" representing a write hit; and the $2^{nd}$ bit representing the occurrence of a victim with a "0" representing that a victim has not occurred and a "1" representing that a victim has occurred. The decoded Event 7 doesn't provide any useful information to the monitoring system 405 since a read hit, write hit, and victim would not occur simultaneously. Alternatively, each decoded event may represent a unique event that may be interpreted by the monitoring system 405. For example, decoded Event 0 which is represented by 000 on the three bits may be interpreted as a read miss, Event 1 which is represented by 001 may represent a read hit, Event 2 which is represented by 010 may represent a write miss, Event 3 which is represented by 011 may represent a write hit, and so on. In this alternative each combination provides a unique meaning rather than each bit line representing a unique meaning.

Encoded events may be partially decoded with event qualifiers to add a specific meaning to the event. FIG. 6 depicts how the encoded events 405 may be partially decoded. If a 3-bit binary encoded event is input to a decoder then the first two bits may be decoded and the third bit may be used as an event qualifier as shown in FIG. 6. For example, the decoded Event 0 which is represented by 00 on the $0^{th}$ and $1^{st}$ bits may be interpreted as a read miss, Event 1 which is represented by 01 may represent a read hit, Event 2 which is represented by 10 may represent a write miss, and Event 3 which is represented by 11 may represent a write hit. Further, the $2^{nd}$ bit may be used as an event qualifier to be interpreted as whether or not a victim has occurred. In particular, if a "0" is present on the $2^{nd}$ bit then a victim has not occurred and the bit may be ignored. If a "1" is present on the $2^{nd}$ bit then a victim has occurred and may qualify a write miss to have additional meaning.

As described above, it may be preferable to allow a user to adjust the bandwidth to the monitoring system for a given debugging task by selecting a subset of decoded events 425 using an event selector 430. It is noted that if the events are fully decoded then a user has the ability to select any subset of events and therefore have full control over the bandwidth of the selected events 435 being input to the monitoring system 405. If the events are partially decoded then any event qualifiers must be selected and input to the monitoring system 405 along with the selected subset of events. For example, if a user only wanted to monitor Event 0 and Event 1 of FIG. 6 then those events may be selected by event selector 430, however, since the $2^{nd}$ bit was not decoded it must also be selected to be input to monitoring system 405. On the other hand, if a user only wanted to monitor Event 0 and Event 1 of FIG. 5 then only those events may be selected by event selector 430 and input to monitoring system 405. As such, a user has more control over the bandwidth of events being input to monitoring system 405 if the events are fully decoded.

Once events are decoded they may be interpreted and recorded by the monitoring system 405 in post-processing software. FIG. 7 depicts the storage of decoded events by the monitoring system 405. In particular decoded events 700 are output from monitoring system 405 to storage 705. Storage 705 may not have sufficient recording bandwidth to record all of the decoded events, especially events that may occur at high-frequency such as read or write hits on the L1 cache. As such, by only recording read or write misses on the L1 cache meaning may still be derived since the absence of a miss is a hit. Further, certain events may only occur on a read or a write. For example, if the cache is read-allocated, evictions can only occur on read misses. Also, if the cache uses a write buffer to queue up write misses, then a write buffer full event may only occur on write misses. Therefore, the eviction event and the write buffer full event can both be recorded in the same location since its meaning can be unambiguously decoded depending on whether or not the event occurred during a read or a write instruction. As such, the recording bandwidth can be adjusted by combining data that may be unambiguously decoded based on the events that are occurring with the combined data.

As such, described above is a system and method for encoding event data from circuitry that is being debugged or profiled. The event data may be decoded to be interpreted and presented to a user of a monitoring system in such a way that the bandwidth of the data input to the monitoring system may be adjusted. Further, the event data being recorded to storage by the monitoring system may be combined in order to adjust the recording bandwidth so long as the combined data may be unambiguously decoded based on the events that are occurring with the combined data.

While various system and method embodiments have been shown and described herein, it should be understood that the disclosed systems and methods may be embodied in many other specific forms without departing from the spirit or scope of the invention. The present examples are to be considered as illustrative and not restrictive. The intention is not to be limited to the details given herein, but may be modified within the scope of the appended claims along with their full scope of equivalents.

What is claimed is:

1. A system comprising:
a circuit configured to execute a series of instructions and output encoded events corresponding to the execution of said instructions;
a decoder for decoding said encoded events; and
a monitoring system that is configured to receive events;
wherein, said decoder is configured to selectively adjust the bandwidth of decoded events; and
wherein said decoder is configured to partially decode said encoded events, and output a subset of said decoded events as well as any remaining encoded events.

2. The system of claim 1, wherein:
said monitoring system receives encoded events; and
said decoder is a software decoder on said monitoring system.

3. The system of claim 1, wherein:
said decoder comprises:
a hardware decoder configured to output decoded events corresponding to said encoded events; and
an event selector configured to selectively output one or more of said decoded events.

4. The system of claim 1, wherein:
said decoder is configured to fully decode all of said encoded events, and output a subset of said decoded events.

5. The system of claim 1, wherein:
said monitoring system is configured to record events.

6. The system of claim 5, wherein:
the amount of events to be recorded may be selectively adjusted by combining events that may be unambiguously decoded.

7. A machine-implemented method comprising:
executing, by a processor, a series of instructions;
generating, by the processor, encoded events corresponding to said executed instructions;
partially decoding, by the processor, said encoded events;
receiving, by the processor, events by a monitoring system;
selectively outputting, by the processor, a subset of said decoded events; and
outputting, by the processor, any remaining encoded events;
wherein, said decoding step is configured to selectively adjust the bandwidth of decoded events.

8. The method of claim 7, wherein:
said events are encoded events; and
said decoder is a software decoder.

9. The method of claim 7, further comprising: recording said events.

10. The system of claim 9, further comprising:
selectively adjusting the amount of events to be recorded by combining events that may be unambiguously decoded.

11. A computer readable storage medium containing computer instructions, which when executed by a computer, cause the computer to:
receive encoded events corresponding to an execution of a series of instructions on a circuit;
partially decode said encoded events;
selectively output a subset of said decoded events; and
output any remaining encoded events; and
wherein, said decode step is configured to selectively adjust the bandwidth of decoded events.

12. The computer readable storage medium of claim 11 further containing computer instructions, which when executed by a computer, cause the computer to:
decode said encoded events in software.

13. The computer readable storage medium of claim 11 further containing computer instructions, which when executed by a computer, cause the computer to:
record said events.

14. The computer readable storage medium of claim 13 further containing computer instructions, which when executed by a computer, cause the computer to:
selectively adjust the amount of events to be recorded by combining events that may be unambiguously decoded.

\* \* \* \* \*

UNITED STATES PATENT AND TRADEMARK OFFICE
CERTIFICATE OF CORRECTION

PATENT NO.       : 7,590,894 B2                           Page 1 of 1
APPLICATION NO.  : 11/383466
DATED            : September 15, 2009
INVENTOR(S)      : Swoboda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 649 days.

Signed and Sealed this

Twenty-first Day of September, 2010

David J. Kappos
*Director of the United States Patent and Trademark Office*